United States Patent [19]
Chu et al.

[11] Patent Number: 6,016,508
[45] Date of Patent: Jan. 18, 2000

[54] SERVER-DETERMINED CLIENT REFRESH PERIODS FOR DYNAMIC DIRECTORY SERVICES

[75] Inventors: Lon-Chan Chu, Bellevue; Yoram Yaacovi, Redmond; Kent F. Settle, Kirkland, all of Wash.

[73] Assignee: Microsoft Corporation, Redmond, Wash.

[21] Appl. No.: 08/886,796

[22] Filed: Jul. 2, 1997

[51] Int. Cl.[7] ..................................................... G06F 13/00
[52] U.S. Cl. ........................... 709/223; 709/203; 709/217
[58] Field of Search .................................. 709/203, 217, 709/219, 223, 224, 225, 226, 227, 228, 229; 707/10, 9

[56] References Cited

U.S. PATENT DOCUMENTS

| | | | |
|---|---|---|---|
| 5,423,043 | 6/1995 | Fitzpatrick et al. | 709/303 |
| 5,461,611 | 10/1995 | Drake, Jr. et al. | 370/420 |
| 5,867,665 | 2/1999 | Butman et al. | 709/239 |

OTHER PUBLICATIONS

Howes, T., et al., "The LDAP Application Program Interface", Request for Comments: 1823; University of Michigan, pp. 1–30 (Aug. 1995).

Williams, R., "User Location Service (ULS)", Internet Draft "draft-uls-1.txt", Microsoft Corporation, pp. 1–9 (Feb. 1996).

Yaacovi, Y., et al., "Lightweight Directory Access Protocol (v3); Extensions for Dynamic Directory Services", Internet Draft "draft-ietf-asid-ldapv3ext-04.txt", pp. 1–8 (May 1, 1997).

Yeong, W., et al., "Lightweight Directory Access Protocol", Request for Comments (RFC) 1777, University of Michigan, ISODE Consortium, pp. 1–22(Mar. 1995).

*Primary Examiner*—Viet D. Vu
*Attorney, Agent, or Firm*—Schwegman, Lundberg, Woessner & Kluth, P.A.

[57] ABSTRACT

Server-determined client refresh periods (CRPs) for dynamic directory services are disclosed. In a dynamic directory maintained by a server, clients must send a refresh message to the server every CRP in order to persist in the directory. The server desirably initially sets the CRP for the clients, and is able to later change the CRP. This allows the server to increase the CRP for at least some of the clients as more clients log onto the server, to ensure that the server is able to timely respond to all the clients.

20 Claims, 7 Drawing Sheets

SERVER-DETERMINED CLIENT REFRESH PERIODS FOR DYNAMIC DIRECTORY SERVICES

FIELD OF THE INVENTION

This invention relates generally to dynamic directory services, and more particularly to server-determined client refresh periods for such services.

BACKGROUND OF THE INVENTION

Current trends in computing suggest that computers are becoming networked to one another on a greater and greater scale. For example, computers that previously were connected to other computers in the same building over a local-area network (LAN) are now commonly connected to other computers all over the world over a wide-area network (WAN), an intranet, or the Internet. The rising prominence of the Internet in fact presages a future where all computers are able to connect with one another over a single vast global network.

With this rise in connectivity comes the need for greater scalability in directory services for such networks. One type of directory is similar to a phone book. The phone book permits a person to look up the phone number of another person so that the first person can communicate with the second person. Similarly, this type of directory for a computer network permits a computer user to look up the electronic address of another computer user (for example, the user's current dynamic Internet Protocol (IP) address in the case of a typical home Internet user), so that the first user can communicate with the second user. Although directory services may be used for a wide variety of different applications other than just to locate a user by looking up his or her electronic address, such user-location applications are nevertheless very common. For example, being able to determine the current IP address of a computer user is a very important feature for such diverse Internet applications as Internet telephony, whiteboarding, and videoconferencing.

However, unlike the phone book, which is a static directory, the directory for a computer network such as the Internet frequently must be dynamic in order to be useful. The phone book is a static directory in that it is not updated very often, typically only once a year when a new book is published. The phone book remains accurate, however, because each person's phone number generally also does not change very often. Conversely, in the case of the Internet, while every user may have a static electronic mail address (that is, an e-mail address that does not change often), every user typically does not have a static IP address. Dial-up users in particular are assigned a dynamic IP address by their Internet Service Provider (ISP) each time they initiate an online session. This lessens the accuracy and usefulness of a static directory for many Internet applications.

Static directory services nevertheless do exist for the Internet, and other Internet-like networks. One such static directory service is provided by the Lightweight Directory Access Protocol (LDAP). The LDAP is known within the art, a version of which is specifically described in W. Yeong, et al., Request for Comments (RFC) 1777, March 1995, which is hereby incorporated by reference. The LDAP permits a server to maintain a static directory. Clients capable of communicating with the server are able to add entries to the directory by sending the server the appropriate request. These entries are static in that they persist until the client establishing them requests their removal from the server. If clients forget to make such requests, the server may maintain their entries in the directory indefinitely, which in time may result in the directory including outdated information. For example, if the server is maintaining a user-location directory of IP addresses, an entry containing the dynamic IP address of a client who has since logged off the Internet is inaccurate.

Dynamic directory services differ from static directory services in that entries must be periodically refreshed by their clients, or otherwise they automatically are removed by the server. Dynamic directory services also exist for the Internet, and other Internet-like networks. One such dynamic directory service is provided by the User Location Service (ULS). The ULS is known within the art, and is specifically described in R. Williams, Internet Draft "draft-uls-1.txt", February 1996, which is hereby incorporated by reference. A server maintaining a dynamic directory as provided by the ULS is receptive to requests from clients to add entries to the directory that include a time-to-live value set by the client. If the client does not refresh its entry before the time-to-live value times out, the server is permitted to delete the entry. Thus, if the server is maintaining a user-location directory of IP addresses, an entry containing the dynamic IP address of a client who has since logged off will eventually be deleted by the server.

Dynamic directories are useful in that they permit the servers maintaining them to periodically perform a garbage collection operation in a manner which does not affect the directories, accuracy. An entry in a dynamic directory is dynamic in that it lives for only a given period of time unless refreshed by its client. The server thus only deletes expired entries. By comparison, servers maintaining static directories perform garbage collections indiscriminately, because they do not know which entries have expired. The servers may delete only very old entries, which probably are outdated, but this means the entries will have persisted long enough to have rendered the directories inaccurate for a period of time. Alternatively, the servers may delete relatively younger entries, in which case the accuracy of the directory is maintained but some accurate entries will likely have been deleted.

Dynamic directories have their own flaws, however. One significant problem with dynamic directories is scalability. For example, a server may have sufficient bandwidth and processing its power to maintain ten-thousand clients refreshing entries having time-to-live values of five minutes. Because the clients themselves set the time-to-live values of their entries, however, the server may be incapacitated if the ten-thousand clients have instead set the time-to-live value of their entries to only five seconds. The server may also be incapacitated if there are one-million clients, instead of only ten-thousand, even if all the clients set the time-to-live value of their entries to five minutes. This scalability problem is especially dramatic in the case of the Internet, where a server cannot know a priori the number of clients that may add an entry to the server's directory, nor the time-to-live value of those entries.

Dynamic directories thus suffer from a problem that does not afflict static directories. A static directory is likely not to become incapacitated because if more entries are added than its server can handle, the server will likely just force a garbage collection to delete the oldest entries so that new ones may be added. A dynamic directory does not have this alternative, since its server can only delete expired entries. Moreover, the client for an entry of a static directory likely only contacts the server twice—first to add the entry, and second to remove the entry—while the client for an entry of a dynamic directory must contact the server periodically to refresh its entry. The main reason that static directories are more scalable is that they generally do not have to service periodic refresh requests, as dynamic directories do. This greater server load is another factor implicated in the scalability problem besieging dynamic directories.

There is a need, therefore, to solve this scalability problem. Such a solution should permit servers to maintain dynamic directories regardless of their bandwidth or processing power. That is, the solution should permit the servers to handle client refreshes in dynamic directories without becoming incapacitated.

SUMMARY OF THE INVENTION

The above-mentioned shortcomings, disadvantages and problems are addressed by the present invention, which will be understood by reading and studying the following specification. A server determines a client refresh period (CRP) for the clients listed in a dynamic directory service maintained by the server. Each of the clients of the directory is provided a CRP such that the dynamic directory only includes those clients that message the server at least once during the CRP. Because the CRP is determined by the server, the server may periodically change the CRP for at least one of the clients so that it does not become overloaded and possibly incapacitated. It is thus able to timely respond to messages received from the clients.

The invention therefore provides a dynamic directory service that does not suffer from the scalability problem of prior art dynamic directory services. The server, for example, may set the CRP for every client to five seconds when ten-thousand clients have logged onto the server, but raise the CRP for every client to five minutes when one-million clients have logged onto the server. In other words, as more clients log onto the server, the server slows down their CRPs, which prevents the server from becoming incapacitated. As clients log off the server (for example, by failing to refresh during a CRP), the server may once again speed up the CRP of the clients remaining logged on.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular LDAP implementation of the invention is described. Finally, in the fifth section, a conclusion of the detailed description is provided.

Hardware and Operating Environment

Figure 1:
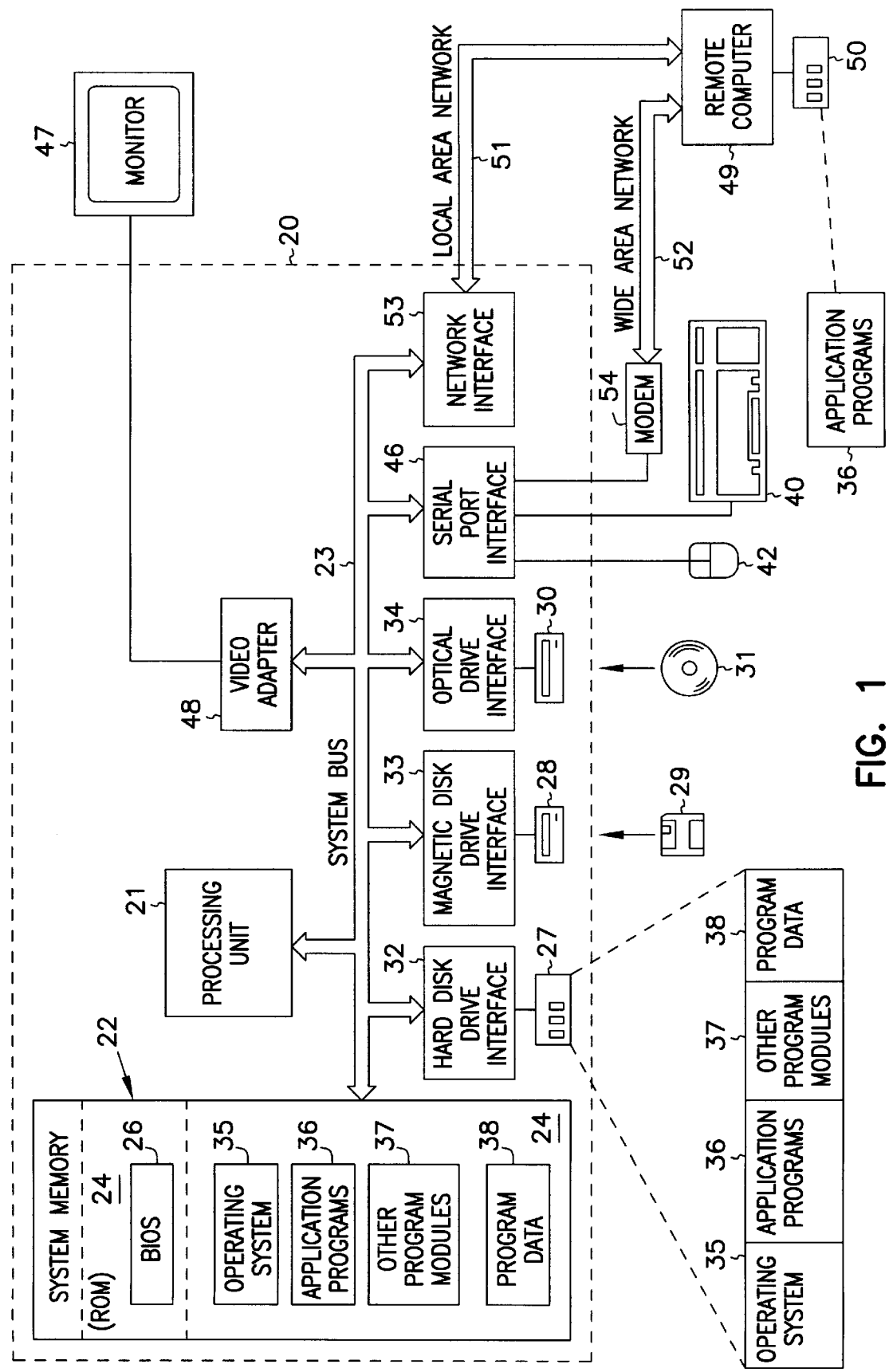
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2A:
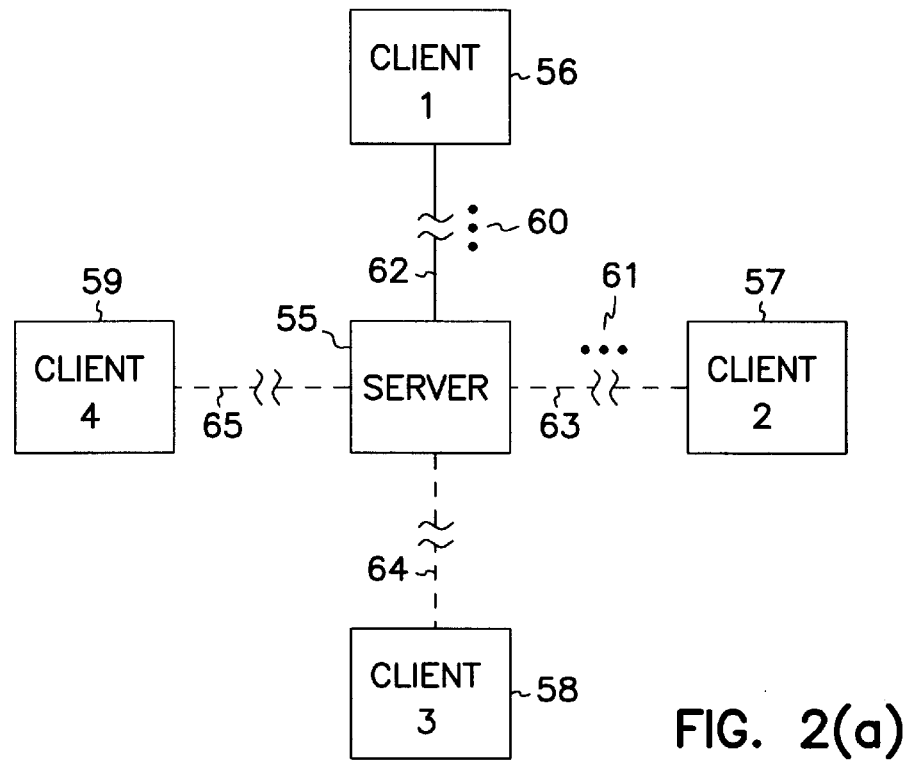
FIGS. 2(a), 2(b), 2(c) and 2(d) show diagrams illustrating a system-level overview of an exemplary embodiment of the invention.
Figure 2B:
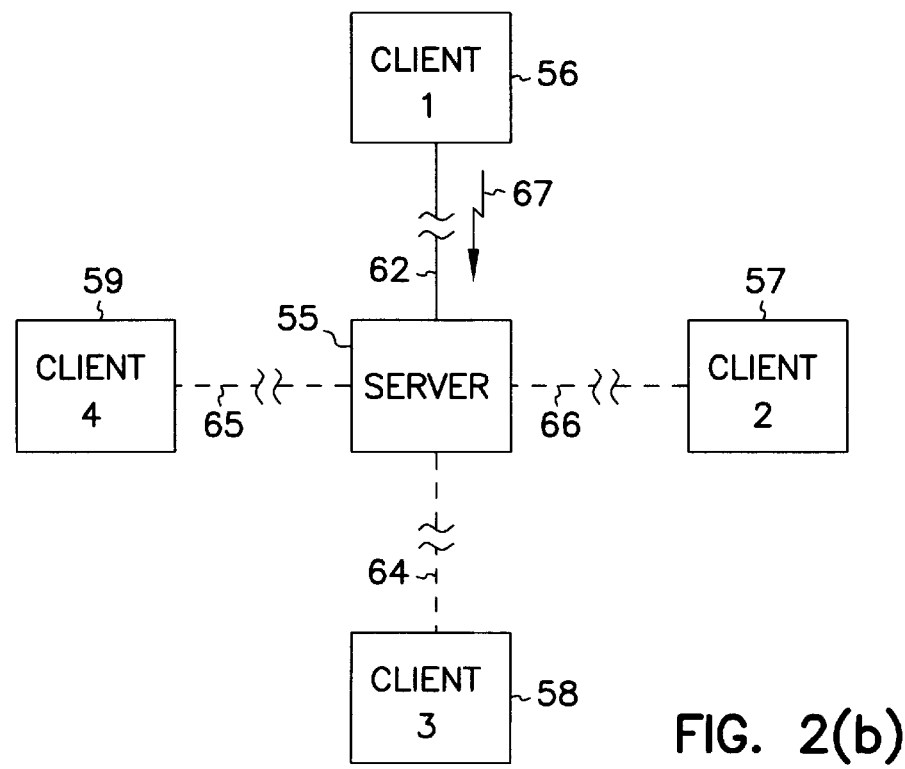
Figure 2C:
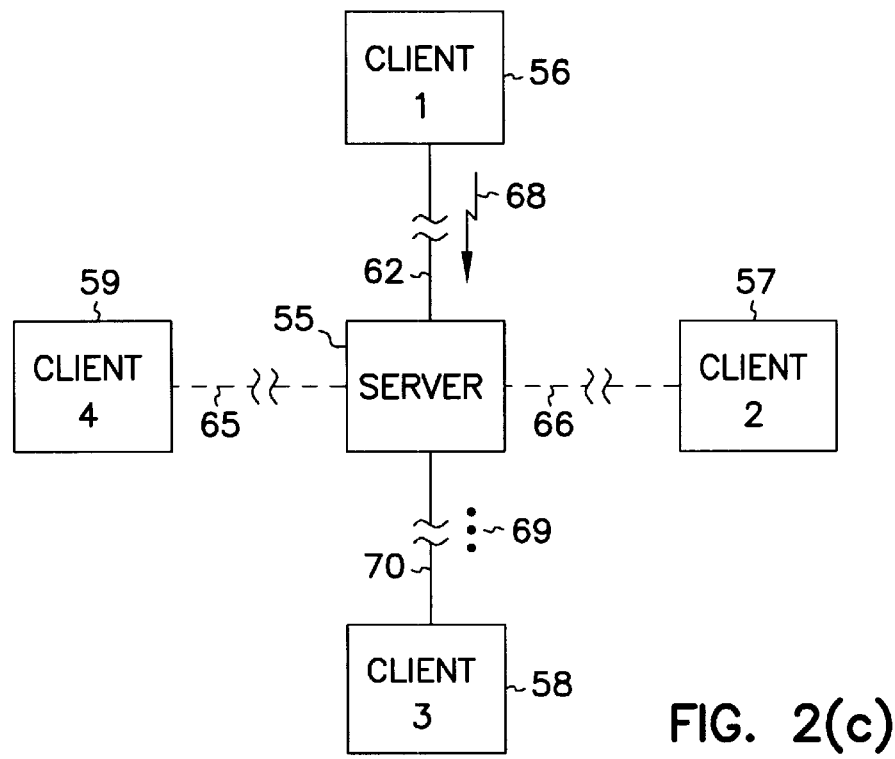
Figure 2D:
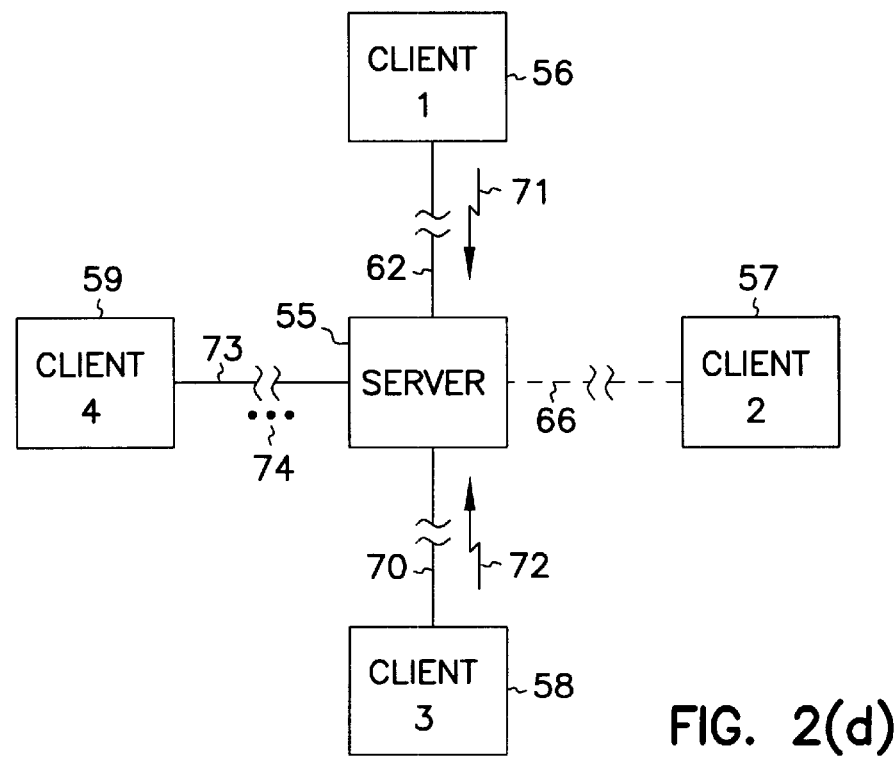

A system level overview of the operation of an exemplary embodiment of the invention is described by reference to FIGS. 2(a), 2(b), 2(c), and 2(d). Referring first to FIG. 2(a), a diagram of a server and four clients is shown. Server 55 may be communicatively coupled with each of clients 56, 57, 58, and 59. Server 55 is a computer, such as the computer 20 of FIG. 1 as has been described. Server 55 has a communications device (not shown) so that it may communicate with each of clients 56, 57, 58, and 59. Server 55 also has a computer-readable media, such as a memory, to store data and computer programs, and a processor to execute the programs from the media. Each of clients 56, 57, 58, and 59 is also a computer, such as the computer 20 of FIG. 1. Each of clients 56, 57, 58, and 59 also has a communications device (not shown) so that it may communicate with server 55. Finally, each of clients 56, 57, 58, and 59 has a computer-readable media, such as a memory, to store data and computer programs, and a processor to execute the programs from the media.

As shown in FIG. 2(a), client 56 and client 57 are logging onto server 55 to initiate an online session with server 55. This is represented by series of dots 60 for client 56 and series of dots 61 for client 57. Initiation of an online session is accomplished by a client sending a message to the server requesting that the client be permitted to log onto the server. Thus, both client 56 and client 57 are sending a message to server 55 to request that they be permitted to log onto server 55. Solid lines 62 and 63 indicate that clients 56 and 57, respectively, have established an online session with server 55. Conversely, dashed lines 64 and 65 indicate that clients 59 and 58, respectively, are offline, since they have not sent a message to server 55 to request that they be permitted to log on.

Server 55 maintains a dynamic directory service of the clients that have logged onto the server. To accomplish this, server 55 maintains a client refresh period (CRP) for each of the clients that have so initiated an online session with the server. This CRP is set by server 55, and communicated to a client after it has logged on. For example, as shown in FIG.

2(*a*), after each client 56 and 57 has sent a message to server 55 to log on, server 55 sends a message back to each client with the CRP for that client. If a client does not message the server at least once during every CRP, the server might remove the client. This messaging of the server at least once during every CRP is known as refreshing. Those of ordinary skill within the art will recognize that a server is not required to maintain a separate CRP for each client.

The dynamic nature of the directory service maintained by server 55 is shown by reference to FIG. 2(*b*). As shown in FIG. 2(*b*), client 56 has messaged server 55 during its CRP, as represented by arrow 67, to refresh its online session with server 55. Therefore, solid line 62 remains between client 56 and server 55 to indicate that client 56 is still logged onto server 55. Conversely, however, client 57 has neglected to message server 55 during its CRP. Therefore, it has been logged off the server, and is offline, as represented by dashed line 66. Dashed lines 64 and 65 also still remain to indicate that clients 58 and 59 are still offline from server 55.

Because the CRP for each client is set by the server, the server may react to the change in the number of clients that are maintaining online sessions by changing the CRP for at least some of the clients. For example, while two clients are logged onto the server as shown in FIG. 2(*a*) (clients 56 and 57), only one client is logged onto the server as shown in FIG. 2(*b*) (client 56). Server 55 may thus decide to decrease the CRP for client 56 in FIG. 2(*b*) from its value in FIG. 2(*a*), since the logging off of client 57 means that server 55 has more processing power and bandwidth to service client 56. For example, the CRP for each of clients 56 and 57 in FIG. 2(*a*) may have been set by the server to ten seconds, meaning that each client must message the server at least once every ten seconds to remain online. The server may decrease the CRP for client 56 in FIG. 2(*b*) to five seconds, since the server no longer has to receive refreshes from client 57. Changing the CRP for a client may be accomplished by the server sending a reply message to the client when the client messages the server to refresh its online session. Reducing the CRP for the remaining client increases the accuracy of the dynamic directory maintained by the server, since the remaining client must refresh with the server more often.

Referring next to FIG. 2(*c*), client 56 has again messaged represented by arrow 68. Therefore, solid line 62 remains between client 56 and server 55 to indicate that client 56 is still logged onto server 55. Clients 57 and 59 remain logged off from server 55, as represented by dashed lines 66 and 65, respectively. However, client 58 has initiated an online session with server 55, as represented by series of dots 69. Thus, solid line 70 indicates that client 58 has established an online session with server 55, such that server 55 has sent client 58 a message providing client 58 with its CRP. If client 58 does not message server 55 at least once during every CRP, it will be logged off from server 55.

Because the number of clients logged onto the server has changed from FIG. 2(*b*) to FIG. 2(*c*), the server may decide to change the CRP for at least some of the clients so that it does not become incapacitated in light of its processing power or bandwidth. For example, the CRP for client 56 in FIG. 2(*b*) may have been set to five seconds (from ten seconds in FIG. 2(*a*)) by server 55 once client 57 was logged off, since it was now the only client maintaining an online session with the server. In FIG. 2(*c*), however, since client 58 is also logged onto server 55 in addition to client 56, server 55 may set the CRP for each of clients 56 and 58 to ten seconds, so that the server is able to timely respond to messages from the clients. This may be accomplished for client 56 by server 55 sending a message setting the new, longer CRP in response to client 56 refreshing its online session (as represented by arrow 68), and for client 58 by sending a message setting the CRP in response to client 58 logging on (as represented by series of dots 69).

Referring next to FIG. 2(*d*), clients 56 and 58 are messaging server 55 to refresh their online sessions, as represented by arrows 71 and 72, respectively. Therefore, clients 56 and 58 are still online with server 55, as represented by solid lines 62 and 70, respectively. Dotted line 66 indicates that client 57 is still offline with server 55. However, client 59 is initiating an online session, as represented by series of dots 73, and is thus logged onto server 55, as represented by solid line 74. Therefore, because there are three clients logged onto server 55 in FIG. 2(*d*) (clients 56, 58 and 59), server 55 may decide to increase the CRP for each of these clients that were previously logged onto server 55 in FIG. 2(*c*). For example, server 55 may decide to increase the CRP for client 56 and 58 from five seconds to ten seconds. Server 55 may also set the CRP for client 59 just logging on to ten seconds as well. This ensures that server 55 does not become incapacitated by an increase in the number of clients logged onto the server.

As shown by reference to FIGS. 2(*a*), 2(*b*), 2(*c*) and 2(*d*), in an exemplary embodiment of the invention, a server maintains a dynamic directory service of the clients who have logged onto the server. When a client first initiates an online session with the server, the server provides the client with a CRP determined by the server. If the client does not message the server at least once during the CRP, it is logged off the server. Furthermore, as more clients log onto the server, the server may lengthen the CRP of at least some of clients, so that it does not become overburdened by so many clients messaging the server. Conversely, as less clients maintain online sessions with the server, the server may shorten the CRP of at least some of the clients, so that the timeliness of the dynamic directory service is increased. In this manner, the exemplary embodiment of the invention solves the scalability found in prior art dynamic directory services.

The actual dynamic directory maintained by the server is not shown in the diagrams of FIGS. 2(*a*), 2(*b*), 2(*c*) and 2(*d*). The invention is not specific to a particular data format for the dynamic directory maintained by the server. For example, a dynamic directory service provided by extending the static directory service of the Lightweight Directory Access Protocol (LDAP), as is described in a following section of this detailed description, may utilize the directory data format already specified by the LDAP, which is a complex tree data structure understood by those skilled in the art.

Figure 3:
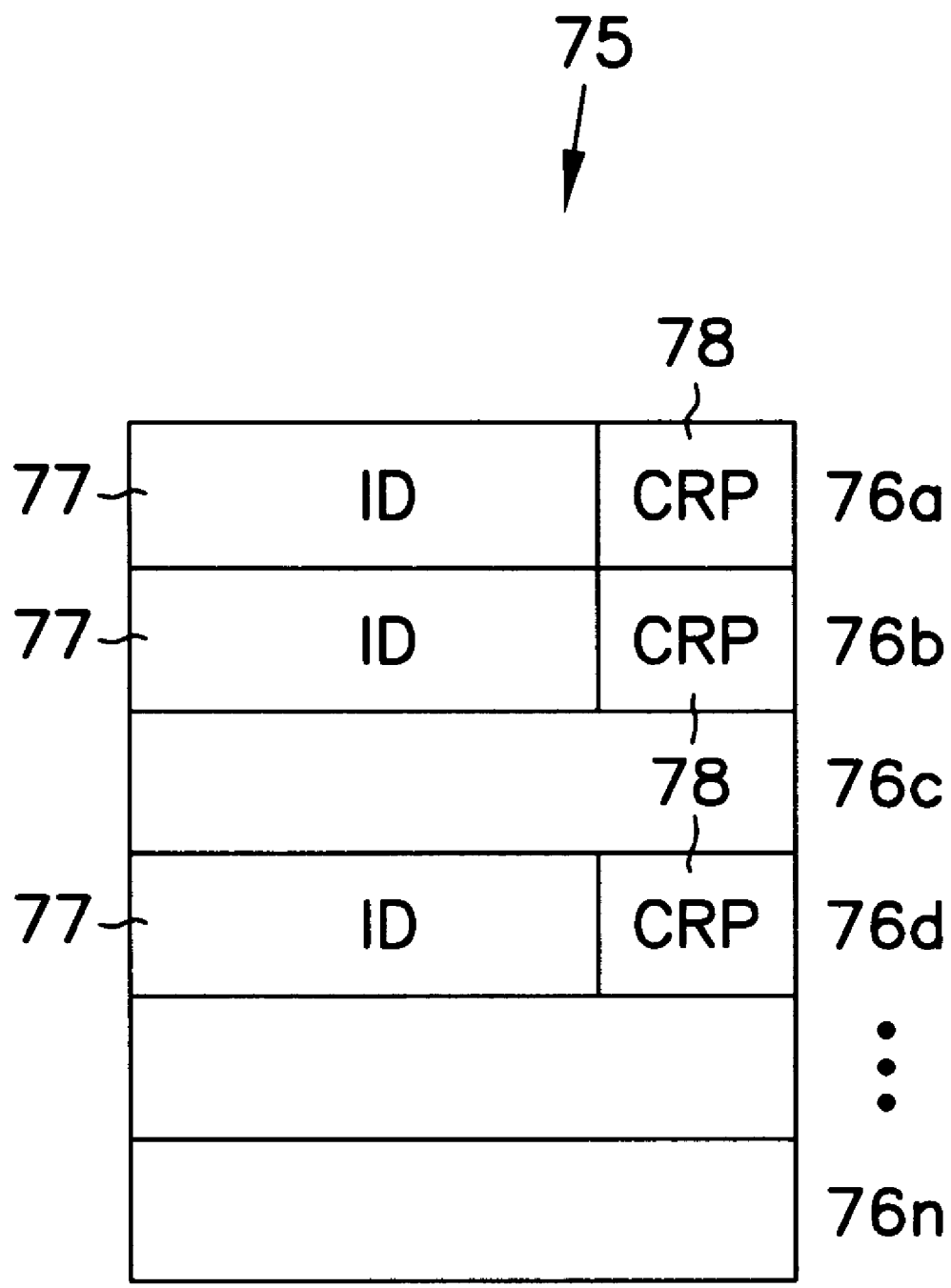
FIG. 3 shows a diagram of a simplified data format of a directory structure that may be utilized by a server in practicing an embodiment of the invention.

For sake of clarity, however, a diagram of a simplified data format of a directory structure that may be utilized by a server in practicing an embodiment of the invention is shown in FIG. 3. Dynamic directory 75 includes sufficient slots 76*a*, 76*b*, 76*c*, 76*d*, . . . , 76*n*, where each slot may hold an entry of the dynamic directory service (for example, corresponding to a particular client that has logged onto the server maintaining the dynamic directory service). Each entry includes an identification field 77 and a CRP field 78. Identification field 77 identifies the client that has requested the server to create the entry of which field 77 is a part. For example, field 77 may represent the e-mail address of this client. CRP field 78 is set by the server, and represents the period during which the client must message the server at least once in order to maintain the entry within the dynamic directory. The value in CRP field 78 thus decreases secondby-second (or another period of time); when it reaches zero, it is considered to have been timed out, and the entry may be deleted. The invention is not limited to a particular number of fields, however. For example, a dynamic IP address field may also be included, so that by looking up the identification field, the dynamic IP address can be obtained. Those of ordinary skill within the art will appreciate that the server is not required to maintain a CRP value for each client, as is shown in this example.

As shown in FIG. 3, slots 76a, 76b, and 76d within dynamic directory 75 each contain an entry having an identification field 77 and a CRP field 78 for a client that is maintaining an online session with the server of the dynamic directory. Conversely, slot 76c as shown in FIG. 3 does not contain an entry. This means that the client that had previously created the entry stored in slot 76c did not refresh the entry within the CRP such that the CRP timed out and the server deleted the entry from slot 76c. However, while slot 76c had contained an entry, the entry in slot 76d was established by a client; this is why slot 76c is empty and slot 76d is not. When another client requests that an entry be created in directory 75, the entry will be created in empty slot 76c.

Those of ordinary skill within the art will appreciate that the directory structure shown in and described in conjunction with FIG. 3 is for illustrative purposes of enabling them to make and use the invention. Specifically, no embodiment of the invention is limited to the directory structure shown in and described in conjunction with FIG. 3. Any other directory structure may be used, as has been described.

The system level overview of the operation of an exemplary embodiment of the invention has been described in this section of the detailed description. The dynamic directory service maintained by a server includes a CRP set by the server for each of the clients having an online session with the server. The CRP may be changed by the server so that the server is able to timely respond to messages from the clients. While the invention is not limited to any particular data format for the directory of the dynamic directory service, for sake of clarity a simplified data format of one directory has been described.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 4:
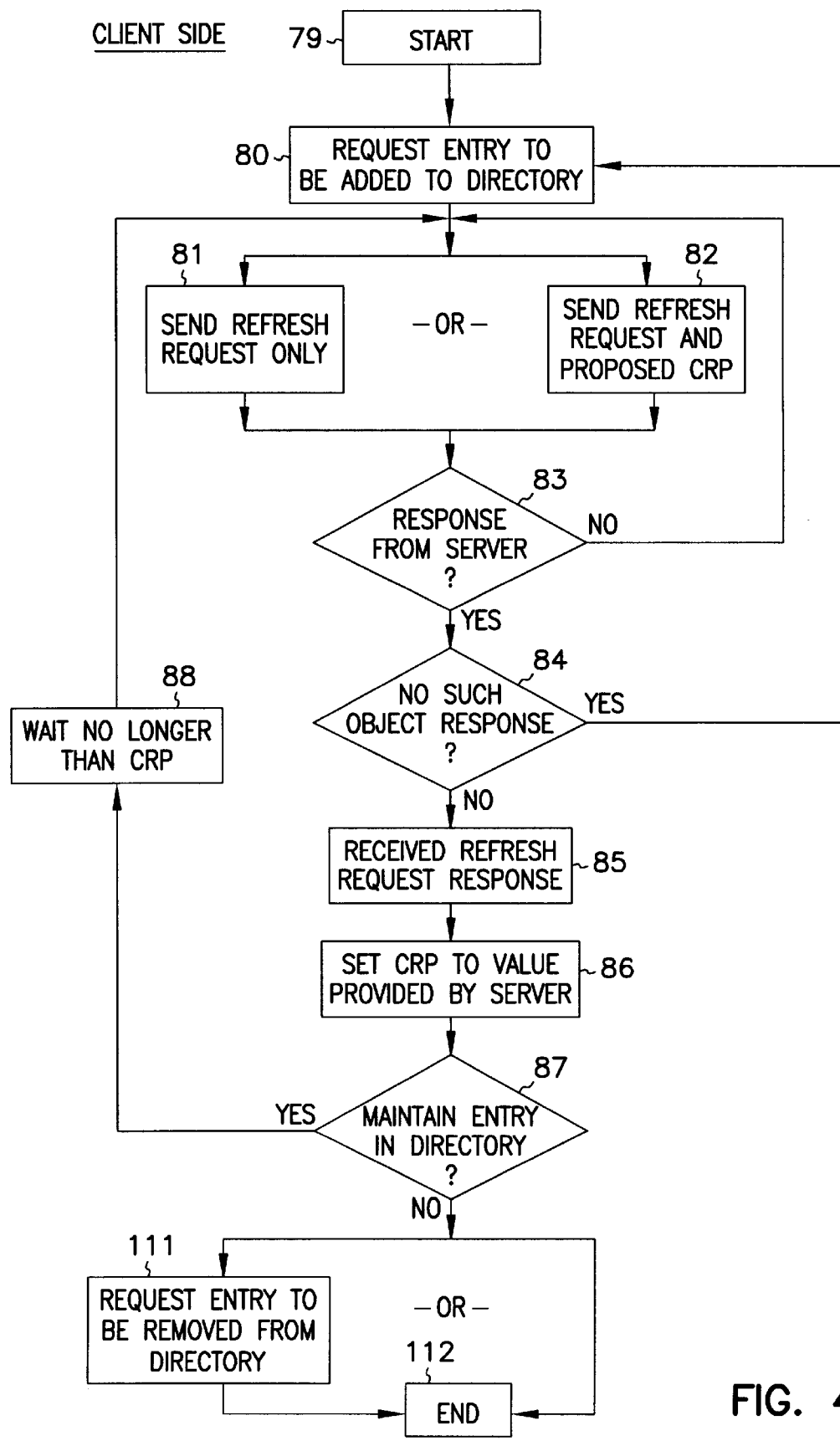
FIG. 4 shows a flowchart of a method to be performed by a client according to an exemplary embodiment of the invention.

Referring first to FIG. 4, a flowchart of a method to be performed by a client according to an exemplary embodiment of the invention is shown. This method is inclusive of the steps or acts required to be taken by the client from logging on to a server maintaining a dynamic directory service to logging off the server. From the starting point of step 79, the client sends in step 80 a message to the server through a communications device to request that an entry for the client be added in the dynamic directory maintained by the server. The invention is not limited to a particular type of entry created for the client. For example, in one embodiment, the entry may correspond to information including the client's dynamic IP address, whereas in another embodiment, the entry may correspond to an Internet video conference or meeting established by the client.

In the exemplary embodiment of FIG. 4, the client next immediately sends a refresh request to the server, by either step 81 or step 82. The refresh request needs to be sent immediately because the client has no other way to determine the value to which it should set its client-refresh period (CRP), as determined by the server, in this embodiment of the invention. In other embodiments of the invention, however, the CRP may be, for example, immediately returned to the client via a response to the log-on request. In step 81, the client sends a message to the server through the communications device that includes just a refresh request. In step 82, however, the client sends a message to the server through the communications device that includes a refresh request having a proposed CRP. That is, in step 82, the client itself asks that the server set its CRP to the proposed value.

If the client does not receive a response from the server through the communications device in a predetermined amount of time, the method of FIG. 4 proceeds from step 83 back to either step 81 or step 82, to resend the refresh request to the server. In addition, the client may receive a "no-such-object" response from the server through the communications device. This means that the server cannot find the client's entry in the dynamic directory. Although the server has previously created such an entry in step 80, if the server goes down and reboots, or is reset for any reason, the directory entry for the client may have been erased. In such instances, the method of FIG. 4 proceeds from step 84 to step 80, so that the client can rerequest that an entry be added to the dynamic directory maintained by the server.

Otherwise the method proceeds to step 85, in which step the client receives a message including a refresh request response from the server through the communications device. This refresh request response includes the value to which the client is to set its CRP, as determined by the server. Therefore, in step 86 the client sets its CRP to the value provided by the server. At this stage, the client must decide whether to maintain its entry in the dynamic directory. If it desires to, the method proceeds from step 87 to step 88, such that the client cannot wait longer than the CRP before proceeding back to either step 81 or step 82 to send another refresh request message to the server. If in step 88 it waits longer than the CRP, the CRP will time out at maintained by the server may be removed.

The loop from step 81 or step 82 through step 88 and back to step 81 or 82 represents the basic method followed by the client to ensure that its entry in the dynamic directory maintained by the server persists. Each time the client sends a refresh request message, it typically receives a response from the server setting the CRP. The CRP may or may not change from response to response. While the client may request that the CRP be set to a particular value, it cannot so dictate to the server. Conversely, the server can dictate the CRP for the client. In this way, the CRP is controlled by the server in the invention, as opposed to being controlled by clients as found in prior art dynamic directories. Because only the server knows the number of clients maintaining entries in its directory, as opposed to the clients themselves, the server may increase the CRP when doing so is required to maintain its timely response ability to the clients (for example, its response in step 84 or 85).

Still referring to FIG. 4, if at step 87 the client decides not to maintain its entry in the dynamic directory at the server, it may either send a message through the communications device to the server to request that its entry be removed from the directory in step ill, or it may just do nothing. If the client sends a removal request, its entry in the directory will be immediately removed by the server. Conversely, if the client does nothing, once its CRP times out, the server will be permitted to delete the entry, such that it will ultimately be removed anyway. In either case, the method of FIG. 4 ends at step 112.

Figure 5A:
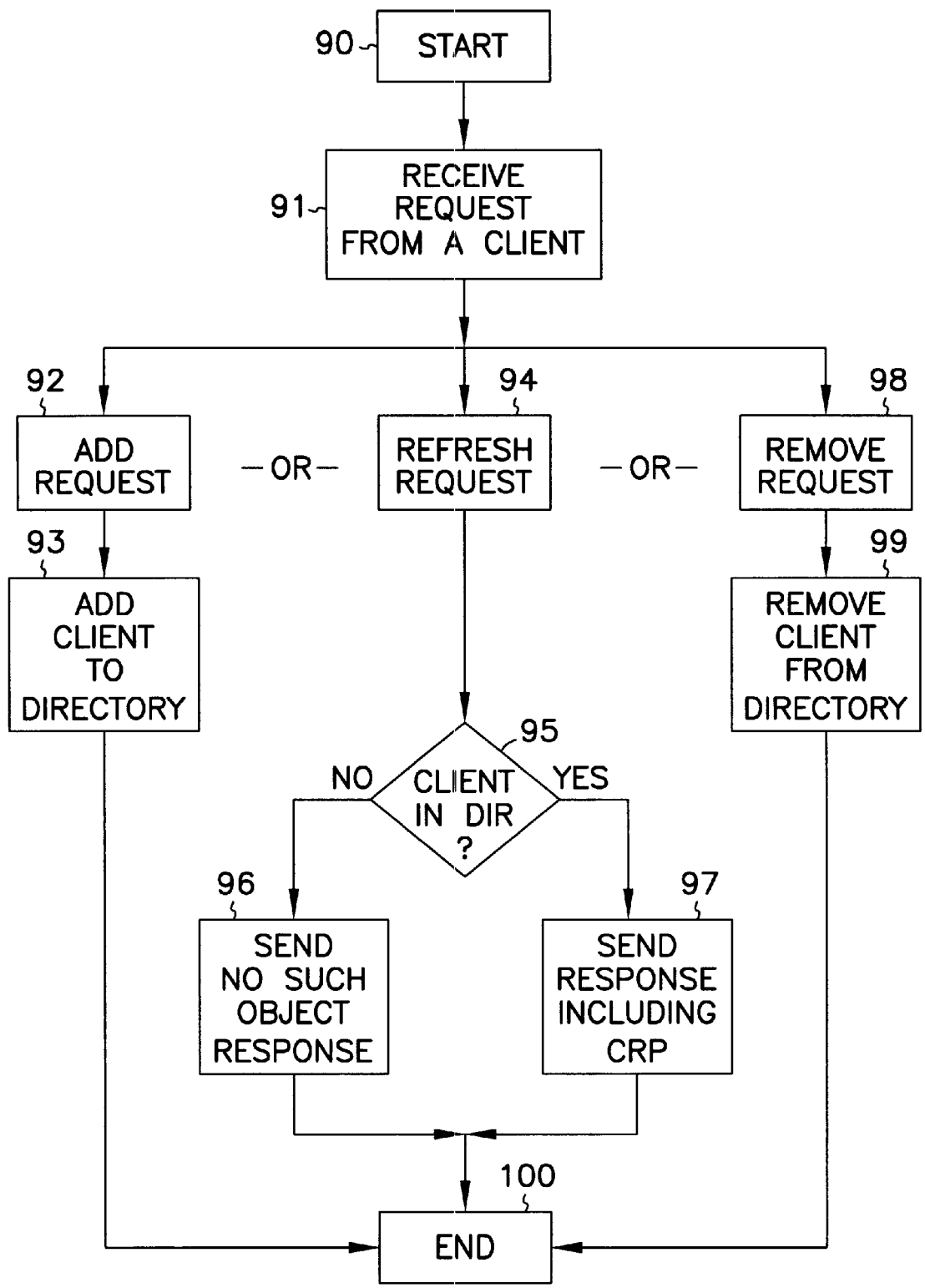
FIG. 5(a) shows a flowchart of an event-driven method to be performed by a server according to an exemplary embodiment of the invention.

Referring next to FIG. 5(*a*), a flowchart of an event-driven method to be performed by a server according to an exemplary embodiment of the invention is shown. This method is event driven in that it is not performed by the server unless and until it receives a message from the client through a communications device of the server. The receipt of such a message may generate an event such that the method of FIG. 5(*a*) is performed by the server. From the starting point of step 90, the server receives a message including a request from a client through its communication device. This request is typically one of three types: a request to add an entry for the client to a dynamic directory maintained by the server, a request to refresh the entry for the client within the dynamic directory, or a request to remove the entry for the client from the dynamic directory.

If the request is to add an entry for the client to the dynamic directory maintained by the server, the method of FIG. 5(*a*) proceeds from step 92 to step 93, at which step an entry for the client is created by the server in the dynamic directory. As has been already described, the invention is not limited to a particular data structure for the dynamic directory. In an LDAP-compatible embodiment, this data structure may be a tree structure known within the art; in another embodiment of the invention, this data structure may be the structure shown in and described in conjunction with FIG. 3.

If the request is to refresh the entry for a client that has already been created in the dynamic directory, the method of FIG. 5(*a*) proceeds from step 94 to step 95. In step 95, the server determines whether the entry for the client is indeed in the dynamic directory. This is necessary because an intermediate problem between the time when the client had sent the request to the server to add an entry to the directory and the time when the client sent the request to refresh the entry may have caused the server to reset such that the dynamic directory has been erased. Thus, if the entry cannot be found in step 95, the method proceeds to step 96 so that the server sends a message including a "no such object" response to the client through the server's communication device. Conversely, if the entry is found in step 95, the method proceeds to step 97 to send a message to the client through the communication device that includes a response to the refresh request having a value to which the client should set its CRP.

The message sent in step 97 permits the server to control the CRP of the client. As will be described in conjunction with FIG. 5(*b*), the server is able to recalculate the CRP for any or all of the clients to ensure that its ability to timely respond to messages from the clients is maintained. Note, however, that the method of FIG. 5(*a*) does not separately handle a refresh request from a client including a proposed CRP as compared to a refresh request that does not include such a proposed CRP (for example, a refresh request sent in step 82 of FIG. 4 as compared to a refresh request sent in step 81 of FIG. 4). Steps 94, 95, 96 and 97 handle either refresh request, such that if the client sends a refresh request including a proposed CRP, the proposed CRP is ignored. The method of FIG. 5(*a*) is illustrated in this manner for purposes of clarity only; the invention is not so limited, and a server method that sets the CRP to a value proposed by a client is amenable to the invention.

Finally, still referring to FIG. 5(*a*), if the request received in step 91 is to remove the entry for a client from the dynamic directory maintained by the server, the method proceeds from step 98 to step 99, and the client's entry is immediately removed from the dynamic directory. As has been described, a client does not have to send such a removal request, however, to cause its entry to be deleted from the directory. The client may instead decide to just not send a refresh request, causing its CRP to time out, in which case the server will eventually delete the client's entry, as will be shown in and described in conjunction with FIG. 5(*b*). The method of FIG. 5(*a*), regardless of the request received by the server from a client, ultimately ends at step 100.

Referring next to FIG. 5(*b*), a flowchart of a method to be performed by a server in the background, according to an exemplary embodiment of the invention, is shown. This method is performed in the background in a manner not limited by the invention. For example, the method may be performed when the server has sufficient processing time, such as between servicing messages received from clients as shown in and described in conjunction with FIG. 5(*a*). Alternatively, the method of FIG. 5(*b*) may be performed as a forced routine, when the server has determined that too much time has elapsed between performances of this method.

From the starting point of step 101, the server removes in step 102 those entries from the dynamic directory that have not been timely refreshed by the their clients. That is, the server removes those entries having a CRP that has timed out. This means that the clients for these entries have not sent a message to the server to refresh the entry during the CRP. This step is thus the garbage collection aspect of FIG. 5(*b*). Performance of this step by the server frees up memory taken up by expired entries within the dynamic directory, which may then be used by new entries added by other clients.

In step 103, the server calculates a new CRP for at least some of the entries in the dynamic directory. The invention is not limited to whether the CRP is the same (equal) for all the entries in the directory, or whether different entries can have different CRP's. The invention is also not limited to the specific manner by which the CRP is calculated.

In an exemplary embodiment, the CRP is calculated according to the formula CRP=(((TotalClients+ClientLimit/ClientLimit)*CRPInterval)), in minutes, and is rounded to the nearest minute. TotalClients is the number of clients currently listed in the dynamic directory, ClientLimit is a predetermined upper limit of the number of clients that the server is able to service in the dynamic directory per CRP, and CRPInterval is a predetermined period of time. In particular, CRPInterval represents the starting CRP for zero clients in the directory, and also represents the interval at which the CRP will be increased successively. Thus, if CRPInterval is set to five minutes, and ClientLimit is set to 1,500, when there are less than 1,500 clients the CRP will be set to five minutes (i.e., or no more than five refreshes at the server per second), when there are between 1,500 and 3,000 clients the CRP will be set to ten minutes, etc.

The CRP is calculated to ensure that the server does not become incapacitated or overburdened relative to its processing power and bandwidth. For example, if too many clients are logged onto the server, the server may not have sufficient processing power to answer all the refresh requests coming from the clients, which may result in the server not being able to timely respond to the clients. Requests may back-up in the server such that some requests are not handled for a long period of time. In addition, the bandwidth of the communications device of the server may not be sufficient to handle over a particular number of messages at a given time, which also may result in the server not being able to timely respond to the clients. Requests may never get through to the server, because too many requests are being generated. Lengthening the CRP for at least some of the clients when more clients log onto the server thus ensure the server is able to timely respond to the clients.

Furthermore, the CRP may be shortened as clients log off the server, so that the accuracy of the information contained in the dynamic directory of the server is increased. When the CRP is relatively long (large), this means that clients are not required to refresh at the server very frequently. Thus, they may go away without logging off, and their entries in the dynamic directory may not be deleted for a relatively long period of time. This decreases the accuracy of the directory. Thus, as clients log off the server, the server may decrease the CRP for the remaining clients so that they are forced to refresh more often, which increases the accuracy of the directory.

Figure 5B:
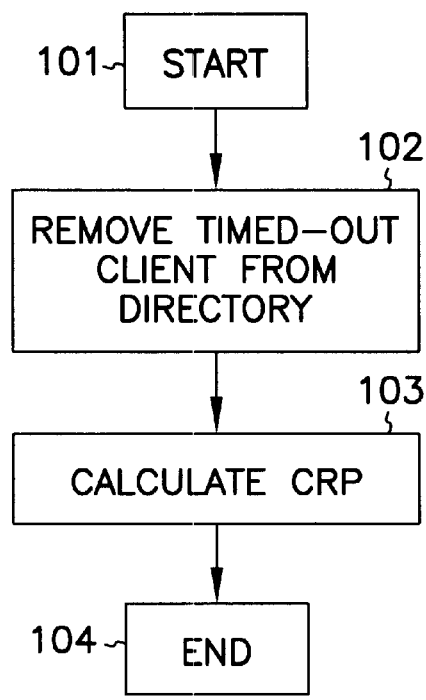
FIG. 5(b) shows a flowchart of a method to be performed by a server in the background, according to an exemplary embodiment of the invention.

The method of FIG. 5(b) ends at step 104. Those skilled in the art will appreciate that steps 102 and 103 of the method may be performed at different times, and not sequentially in the same background method as is shown in the exemplary embodiment of FIG. 5(b). The actions performed in steps 102 and 103 are shown to be performed sequentially for sake of clarity only, however. For example, the CRP may instead be calculated each time an entry is added to or removed from the directory (such as after step 93 or step 99, respectively, of FIG. 5(a)). The CRP may also be calculate each time a refresh message is serviced for a particular client.

The particular methods performed by the server and the clients of an exemplary embodiment of the invention have been described. The method performed by a client has been shown by reference to a flowchart including all the steps from the client first logging onto the server until the client logs off the server. The methods performed by the server has been shown by reference to a flowchart of a method driven by the event of the server receiving a message from a client, and also by reference to a flowchart of a method performed by the server in the background.

LDAP Implementation

In this section of the detailed description, a particular implementation of the invention is described that is compatible with the Lightweight Directory Access Protocol (LDAP) known within the art. The LDAP provides for a directory service that is static, not dynamic. However, the LDAP also permits additional operation requests and responses to be added to the protocol. This description of the extensions added by the LDAP implementation of the invention enables one skilled in the art and familiar with the LDAP to extend LDAP to have dynamic-directory capability, including server-determined CRP's. Further information is provided in Y. Yaacovi, et al., Internet Draft "draft-ietf-asid-1dapv3ext-04.txt", May 1997, which is hereby incorporated by reference.

LDAP is an object-oriented protocol in which a client is able to send a message to a server maintaining a directory of object entries, to request that the server add (instantiate) an object entry to the directory. The following object class, to which the objectclass attribute of the object entry is set, permits the object to be a dynamic, rather than a static, entry:
(1.3.6.1.4.1.1466.101.119.2 NAME 'dynamicObject'
 DESC 'This class, if present in an entry, indicates that this entry has a limited lifetime and may disappear automatically when its time-to-live has reached 0. There are no mandatory attributes of this class, however if the client has not supplied a value for the entryTt1 attribute, the serve will provide one.'
 SUP top AUXILIARY )

Furthermore, the dynamic object must have the following operational attribute, using the AttributeTypeDescription notation known within the art:
(1.3.6.1.4.1.1466.101.119.3 NAME 'entryTt1'
 DESC 'This operational attribute is maintained by the server and appears to be present in every dynamic entry. The attribute is not present when the entry does not contain the dynamicObject object class. The value of this attribute is the time in seconds that the entry will continue to exist before disappearing from the directory. In the absence of intervening refresh operations, the values returned by reading the attribute in two successive searches are guaranteed to be nonincreasing. The smallest permissible value is 0, indicating that the entry may disappear without warning. The attribute is marked NO-USER-MODIFICATION since it may only be changed using the refresh operation.'
 SYNTAX 'Integer' SINGLE-VALUE NO-USER-MODIFICATION USAGE is dSAOperation)

To allow servers to support dynamic objects in only a part of the directory (DIT), the following operational attribute is defined, also using the AttributeTypeDescription notation known within the art:
(1.3.6.1.4.1.1466.101.119.4 NAME 'dynamicSubtrees'
 DESC 'This operational attribute is maintained by the server and is present in the Root DSE, if the server supports the dynamic extends described in this draft. The attribute contains a list of all the subtrees in this directory for which the server supports the dynamic extensions.'
 SYNTAX 'DN' NO-USER-MODIFICATION USAGE dSAOperation)

To permit a client to send a message including a refresh request to the server (via an LDAP PDU), to refresh the entry object it previously added to the directory maintained by the server, an LDAP ExtendedRequest is defined as follows:
 ExtendedRequest::=[APPLICATION 23] SEQUENCE (requestname [0] LDAPOID, requestvalue [1] OCTET STRING)
The requestname field must be set to the string "1.3.6.1.4.1.1466.101.119.1". The requestvalue field will contain as a value the DER-encoding of the following ASN.1 data type:
 SEQUENCE {
 entryname [0] LDAPDN,
 requestTt1 [1] INTEGER }

Figure 6A:
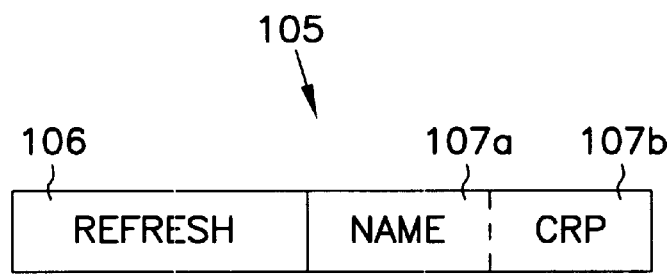
FIG. 6(a) shows a diagram of an ExtendedRequest data structure for use in an LDAP-compatible implementation of the invention; and, FIG. 6(b) shows a simplified diagram of an ExtendedResponse data structure for use in an LDAP-compatible implementation of the invention.

This defined extended request data structure is shown diagrammatically in FIG. 6(a). Extended request data structure 105 includes two fields, field 106, and subfields 107a and 107b that constitute the second field. Field 106 corresponds to the requestname field of the ExtendedRequest structure, and represents a predetermined string corresponding to a refresh request sent from a client to a server before a server-determined CRP times out, to keep the client listed in a directory of clients maintained by the server. Field 107a corresponds to the entryname subfield, and represents a unique name corresponding to a particular directory entry. Finally, field 107b corresponding to the requestTt1 field, and is a value to which the client desires the CRP set.

To permit a server to respond to a refresh request sent by a client (via an LDAP PDU), including the CRP for the client, an LDAP ExtendedResponse is defined as follows:

ExtendedResponse::=[APPLICATION 24] SEQUENCE{responsename [0] LDAPOID OPTIONAL,
 response [1] OCTET STRING OPTIONAL,
 standardresponse [2] LDAPResult}

The requestname field must be set to the string "1.3.6.1.4.1.1466.101.119.1". The response field will contain as a value the DER-encoding of the following ASN.1 data type:

SEQUENCE {
 responseTt1 [1] INTEGER }

The responseTt1 field is the time in seconds which the server choose to have as the time-to-live field (that is, the CRP field) for that entry. It must not be any smaller than that which the client requested, and it may be larger.

If the refresh operation was successful, the errorcode field in the standardresponse part of an ExtendedResponse will be set to success. In case of an error, the responseTt1 field will have the value 0, and the errorcode field will contain an appropriate value as follows. If the entry named by entryname could not be located, the errorcode field will contain "noSuchobject". If entry is not dynamic, the errorcode will contain "ObjectClassViolation." If the requester does not have permission to refresh the entry, the errorcode field will contain "insufficientAccessRights". If the requestTt1 field is too large, the errorcode field will contain "sizeLimitExceeded".

Figure 6B:
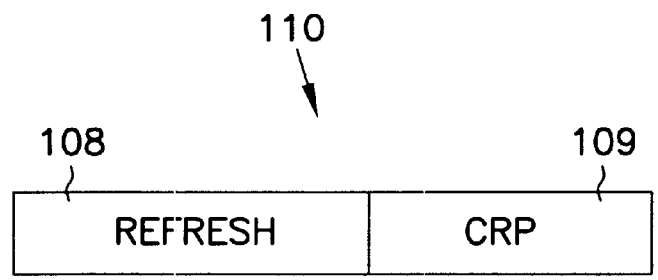

A simplified version of the defined extended response data structure is shown diagrammatically in FIG. 6(b). Extended response data structure 110 includes two fields, field 108 and field 109. Field 108 corresponds to the responsename field of the ExtendedResponse structure, and represents a predetermined string corresponding to a refresh request response from a server to a client in response to a refresh request sent by the client to the server, to keep the client listed in a dynamic directory maintained by the server. Field 109 corresponds to the responseTt1 field, and is a value to which the client must set a CRP such that the client must send a refresh request to the server at least during every CRP to keep the client listed in the dynamic directory.

Those skilled in the art will appreciate that the above-defined LDAP implementation of the invention extends LDAP to include dynamic directories having client-determined CRP's with minimal intrusion. For example, when a client requests that a dynamic entry be added to the directory, the request does not vary from standard such LDAP requests, except that the entry must have its objectclass attribute defined as dynamicObject, etc. In addition, when the server responds to this request, its response indicating success or failure also does not differ from standard such LDAP responses. However, this minimal intrusion into the extending of the protocol means that after a dynamic entry has been created, the client must immediately thereafter send a refresh request in order to obtain the CRP value from the server. This is consistent with the method of FIG. 4 to be performed by the client, as has been previously described.

An implementation of the invention compatible with LDAP has been described. The object class for dynamic objects in LDAP trees, as well as two operational attributes for such objects have been defined. Finally, an ExtendedRequest and an ExtendedResponse structure have been both defined and shown diagrammatically.

Conclusion

A server-determined client refresh period (CRP) for a dynamic directory service has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that a client may request that the server create more than one entry for it in the dynamic directory maintained by the server. In this situation, what has been described in this application as the client logging onto the server will be recognized as also meaning the client requesting that the server create an entry for it in the dynamic directory. Furthermore, those of ordinary skill within the art will appreciate that a client may request that the server create one or more dynamic attributes for an otherwise static entry in a directory. In this situation as well, what has been described as the client logging onto the server will be recognized as also meaning the client requesting that the server create one or more dynamic attributes in a new static entry for it in the directory. A client may also request that the server create one or more dynamic entries in a directory having both static and dynamic entries.

The terminology used in this application with respect to a client logging onto a server is meant to include all of these cases. Therefore, it is manifestly intended that this invention be limited only by the following claims and equivalents thereof.

We claim:

1. A computerized system comprising:
 a plurality of clients, each having a client refresh period (CRP); and,
 a server, communicatively coupled to each client, and maintaining a dynamic directory of only the clients messaging the server at least once during every CRP,
 wherein the server at least periodically changes the CRP for at least one of the clients so that the server is able to timely respond to messages received from the clients.

2. The computerized system of claim 1, wherein the CRP for each client is identical to the CRP for every other client.

3. A computerized client comprising:
 a processor;
 a computer-readable medium operatively coupled to the processor and storing data representing a client refresh period (CRP);
 a communications device operatively coupled to the processor to communicatively couple with a server; and,
 a computer program executed by the processor from the medium and comprising instructions to cause the client to log onto the server through the communications device and in response receive from the server a message setting the CRP to a value determined by the server; and,
 message the server through the communications device at least once during every CRP to persist in a dynamic directory maintained by the server.

4. The computerized client of claim 3, wherein the computer program further comprises instructions to cause the client to receive from the server through the communications device a message changing the CRP to a value different than the value to which the CRP was first set.

5. A computerized server comprising:

a processor;

a computer-readable medium operatively coupled to the processor, the medium storing data representing a client refresh period (CRP) for each of a plurality of clients, and a dynamic directory of the clients messaging the server at least once during every CRP;

a communications device operatively coupled to the processor to communicatively couple with the plurality of clients; and, a computer program executed by the processor from the medium and comprising instructions to cause the server to calculate the CRP for each client and to receive messages through the communications device from the clients at least once during every CRP.

6. The computerized server of claim 5, wherein the computer program further includes instructions to cause the server to send a message through the communications device to at least one of the clients changing the CRP from its previous value.

7. The computerized server of claim 5, wherein the computer program further includes instructions to cause the server to add to the dynamic directory a new client logging onto the server through the communications device; and, send to the new client through the communications device a message setting a CRP for the new client as calculated by the server.

8. A computerized method for dynamic directory service maintenance comprising:

sending a refresh request from a client to a server maintaining a dynamic directory of clients;

determining at the server whether the client sending the refresh request is listed in the dynamic directory; and, sending a response from the server to the client including a server-determined client refresh period (CRP) upon the server determining that the client is listed in the dynamic directory, wherein the client sends further refresh requests to the server at least once during every CRP.

9. The computerized method of claim 8, further comprising:

sending a not-found response from the server to the client upon the server determining that the client is unlisted in the dynamic directory; and, sending a request from the client to the server to add the client to the dynamic directory.

10. The computerized method of claim 8, further comprising resending the refresh request from the client to the server upon the client not receiving a response from the server.

11. A computer-readable medium having computer-executable instructions to a cause a server computer to perform a method comprising:

calculating a client refresh period (CRP);

sending a response to a client including the CRP upon receiving a refresh request from the client and locating the client in a dynamic directory; and, removing clients from the dynamic directory from which refresh requests have not been received during every CRP.

12. The computer-readable medium of claim 11, wherein the CRP is calculated such that the server is able to timely respond to requests received from clients.

13. The computer-readable medium of claim 11, wherein calculating the CRP is accomplished according to a formula CRP=(((TotalClients+ClientLimit)/ClientLimit)*CRPInterval), such that TotalClients is the number of clients currently listed in the dynamic directory, ClientLimit is a predetermined upper limit of the number of clients that the server is able to service in the dynamic directory per CRP, and CRPInterval is a predetermined period of time.

14. The computer-readable medium of claim 11, wherein the method further comprises:

adding a client to the dynamic directory upon receiving a request from the client to add the client to the directory; and, removing a client from the dynamic directory upon receiving a request from the client to remove the client from the directory.

15. A computer-readable medium having computer-executable instructions to cause a client computer to perform a method comprising:

sending a request to a server to be added to a dynamic directory of clients maintained by the server;

sending a refresh request to the server;

receiving a response to the refresh request from the server including a client refresh period (CRP) value; and, setting a client refresh period (CRP) to the CRP value received from the server, such that the client sends further refresh requests to the server at least once every CRP.

16. The computer-readable medium of claim 15, wherein the refresh request sent to the server includes a proposed client refresh period (CRP) to which to set the CRP.

17. The computer-readable medium of claim 15, wherein the method further comprises sending a request to the server to be removed from the dynamic directory.

18. A computer-readable medium having stored thereon an extended request data structure compatible with the Lightweight Directory Access Protocol (LDAP) comprising:

a first data field including data representing a predetermined string corresponding to a refresh request sent from a client to a server before a server-determined client refresh period (CRP) times out, to keep the client listed in a dynamic directory of clients maintained by the server; and, a second data field including data representing a unique name corresponding to a particular client.

19. The computer-readable medium of claim 18, wherein the second data field further includes data representing a value to which the client desires the CRP set.

20. A computer-readable medium having stored thereon an extended response data structure compatible with the Lightweight Directory Access Protocol (LDAP) comprising:

a first data field including data representing a predetermined string corresponding to a refresh request response from a server to a client in response to a refresh request sent by the client to the server, to keep the client listed in a dynamic directory maintained by the server; and, a second data field including data representing a value to which the client must set a client refresh period (CRP) such that the client must send a refresh request to the server at least during every CRP to keep the client listed in the dynamic directory.

* * * * *

UNITED STATES PATENT AND TRADEMARK OFFICE
CERTIFICATE OF CORRECTION

PATENT NO. : 6,016,508
DATED : January 18, 2000
INVENTOR(S) : Chu et al.

It is certified that error appears in the above-identified patent and that said Letters Patent is hereby corrected as shown below:

<u>Column 7,</u>
Line 44, "messaged represented" should read -- messaged server 55 to refresh its online session with server 55, as represented --.

<u>Column 11,</u>
Line 7, "step ill" should read -- step 111 --.

<u>Column 14,</u>
Line 1, "objectclass" should read object -- objectClass --.
Lines 50, 52, and 63, "requestname" should read -- requestName --.
Lines 50, and 53, "requestvalue" should read -- requestValue --.
Line 57: "entryname" should read -- entryName --.

<u>Column 15,</u>
Lines l and 27, "entryname" should read -- entryName --.
Lines 9 and 37, "responsename" should read -- responseName --.
Lines 11 and 23, "standardresponse" should read -- standardResponse --.
Line 12, "requestname" should read -- requestName --.
Lines 27, 28, 30, and 32, "errorcode" should read -- errorCode --.
Line 53, "objectlass" should read -- objectClass --.

Signed and Sealed this

Twentieth Day of January, 2004

JON W. DUDAS
*Acting Director of the United States Patent and Trademark Office*